United States Patent [19]

Harris

[11] 3,986,253

[45] Oct. 19, 1976

[54] ELECTRICAL INSULATOR FOR ARMATURE SHAFTS AND METHOD OF INSTALLATION

[75] Inventor: Robert L. Harris, Freeport, N.Y.

[73] Assignee: Niemand Bros. Inc., Elmhurst, N.Y.

[22] Filed: Sept. 5, 1975

[21] Appl. No.: 610,549

[52] U.S. Cl. .................................. 29/598; 138/141; 138/146; 156/79; 156/294; 174/110 F; 174/138 R; 264/46.6; 264/46.9; 310/43; 310/261; 428/315; 428/320
[51] Int. Cl.² .................... H02K 15/10; H02K 1/04; H01B 3/18
[58] Field of Search ........ 174/110 F, 137 R, 137 A, 174/137 B, 138 R, 167, 209; 29/596, 598; 138/140, 141, 145, 146; 156/78, 79, 293, 294; 264/45.1, 46.4, 46.5, 46.6, 46.8, 46.9, 272; 310/43, 45, 50, 235, 261; 428/36, 310, 313, 315, 320

[56] References Cited

UNITED STATES PATENTS

| 2,186,793 | 1/1940 | Wodtke ..................... 174/110 F UX |
| 3,420,363 | 1/1969 | Blickensderfer ............... 264/46.5 X |
| 3,737,988 | 6/1973 | Bednarski ........................ 310/43 X |

Primary Examiner—Laramie E. Askin
Attorney, Agent, or Firm—Kane, Dalsimer, Kane, Sullivan and Kurucz

[57] ABSTRACT

Disclosure is made of a universally fitting electrical insulator for mounting between the armature shaft and the windings and laminations of an armature. The disclosure is also of a method for mounting the insulator in the armature. The insulator and method are particularly useful in the production of double insulated electrical hand tools.

13 Claims, 5 Drawing Figures

ELECTRICAL INSULATOR FOR ARMATURE SHAFTS AND METHOD OF INSTALLATION

BACKGROUND OF THE INVENTION

1. Field of the Invention

The invention is related to electrical insulator components of electrical motors and methods of their installation and more particularly is related to tubular electrical insulators for mounting between the armature shaft and the windings or laminations of an armature in electrical hand tools.

2. Brief Description of the Prior Art

Prior hereto, glass-reinforced polymeric resin insulator tubes have been mounted on the armature shafts of electrical hand tools to provide so-called "double insulation." Phenolic impregnated paper insulating tubes have been similarly used. These prior art insulators are prepared for use on armature shafts of specific diameters by grinding on both the inner and outer surfaces to meet extremely exact tolerance specifications. The armature shafts also are generally milled to meet very close tolerance specifications so that mounted insulator tubes will form a tight frictional engagement with the armature shaft.

The glass-reinforced polymeric resin insulators are generally mounted within the laminations by press fitting to obtain the desired tight frictional engagement. The mating armature shaft is then pressed into the insulator tube. The phenolic impregnated paper insulating tubes are generally installed by bonding the close fitting insulation tube to the armature shaft with an applied cyanoacrylate adhesive. The assembled shaft and insulator are bonded to the laminations by the same adhesive.

Those skilled in the art recognize the shortcomings of the prior art armature insulators and the methods of their installation. For example, the need for grinding the tubular insulators to precise dimensions on both inner and outer surfaces is costly. The need to meet very rigid dimensional specifications in both insulator body and armature shafts increases the potential for rejected components and materials, thereby increasing costs and causing economic waste of our national resources, i.e.; labor, materials and energy. Further, the methods of installation, such as by press-fitting require costly capital expenditures for press-fitting apparatus. Although this particular disadvantage would seem to have been eliminated by installation of the phenolic insulator tubes by bonding with a cyanoacrylate adhesive, this latter method has not achieved a high degree of reliability in effecting a permanent bond, although considerable time and money has been invested in development of the method.

The novel tubular insulators of my invention and the method of their installation eliminate many of the problems and disadvantages of the prior art. For example, the insulators of my invention do not require precise inner or outer diameters and may be mounted on armature shafts having a variety of different diameters and having relatively wide tolerances in dimension. Similarly, the outer dimensions of the insulator tubes need not meet critical dimensional specifications for the distance between laminations. The invention will reduce the inventory of different insulator tube sizes which a manufacturer must presently maintain. Further, the need for critical dimensions in the armature shafts is eliminated and the insulators of the invention may be readily installed on "off-specification" armature shafts, thereby decreasing the rejection rates of components. The method of the invention is also highly reliable.

In addition, the insulated armature shaft prepared according to the method of the invention have improved thermalresistance and improved electrical insulating properties over many of the prior art insulated armatures.

SUMMARY OF THE INVENTION

The invention comprises a universal fitting electrical insulator for mounting between the armature shaft and the windings or laminations of an armature, which comprises; a tubular body having two open ends and which comprises an outer layer of an electrical insulative polymeric material and an inner layer of a synthetic polymeric resin, foam forming, adhesive composition. The insulators of the invention are useful in double-insulated electrical hand tools.

The invention also comprises a method of mounting a tubular insulator on an armature shaft, which comprises;

providing a tubular insulator having two open ends and which comprises an outer layer of an electrical insulating polymeric material and an inner layer of a synthetic polymeric resin, foam-forming, adhesive composition;

inserting a portion of said armature shaft through the open ends of said insulator; and causing said foam-forming adhesive composition to foam;

whereby said insulator becomes bonded to the inserted portion of said armature shaft.

The invention also comprises the insulated armature shafts prepared by the method of the invention.

The term "universal fitting electrical insulator" as used throughout the specification and claims means a single electrical insulator of any given dimensions which may be mounted on a variety of armature shafts of different diameters or within the space defined by the laminations, said spaces being of variable dimensions.

DETAILED DESCRIPTION OF THE PREFERRED EMBODIMENTS

An essential feature of the so-called "double insulated" electrical hand tools such as electric powered drills, sanders, etc., is the positioning of an electrical insulator on the armature shaft, between the shaft and the armature windings and laminations. The invention concerns an improved insulator and the method of its installation in the double insulated tool. For continuity, the preferred embodiments of the invention are conveniently described with reference to the accompanying drawings of FIGS. 1–3, inclusive.

Figure 1:
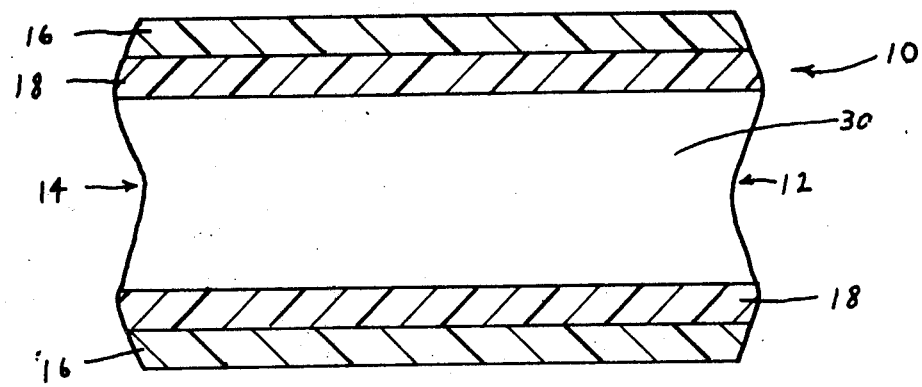
FIG. 1 is a cross-sectional side elevation in-part of an embodiment insulator of the invention.

FIG. 1 is a cross-sectional side elevation in-part of an embodiment insulator 10 of the invention. The insulator 10 is a tubular body having open ends 12 and 14 and comprises an outer layer 16 and an inner layer 18 defining a space 30. The outer layer 16 may be fabricated from any convenient rigid, semi-rigid or flexible polymeric material which is an electrical insulator. Representative of such materials are natural polymeric materials such as natural rubber and cellulose in the form of paper, wood and the like including resin impregnated forms such as phenolic impregnated paper and the like. Illustrative of synthetic polymeric insulators are cellulose acetate, polyethylene, polypropylene, acrylonitrile-butadiene-styrene copolymers, polyurethane elastomer, polystyrene, polyvinyl chloride, butadiene-acrylonitrile rubber, polyimide, polyamide, polyacrylic and the like. Advantageously the material of layer 16 is thermally conductive and weather-proof or treated to make it weatherproof, i.e.; resistant to the effects of water, heat and cold. It is particularly advantageous to add an outer ply or plies of non-porous, synthetic polymeric resin film to the layer 16 when the layer 16 is a porous material such as Kraft paper. The additional added ply or plies reduces the tendency of the paper to act as a capillary in absorbing adhesive from the inner layer 18. Non-porous films are represented by polyethylene, polypropylene, polyamide, polyimide and like films. The outer film ply, when selected from high temperature resistant materials such as films of polyamides and polyimides also serves to enhance the thermal rating of the insulator layer 16.

The inner layer 18 is an expandable, synthetic, polymeric resin foam forming adhesive composition adhered to the inner surface of the outer layer 16. The inner layer 18 may be adhered or laminated to the inner surface of outer layer 16 by any conventional and known method. For example, the insulator tube 10 may be fabricated by conventional extrusion and laminating techniques for making a multi-layer tube; see for example U.S. Pat. No. 3,491,799. The thickness of the respective layers 16, 18 is not critical other than in that the Underwriter's Laboratory has set a standard minimum thickness for such insulating tubes of 0.040 inch. Generally the layer 16 is of sufficient thickness to provide electrical insulation and the layer 18 may be circa 2/1000 to 5/1000 of an inch.

The foam forming adhesive composition which comprises inner layer 18 may be any of the well known expandable foam forming adhesive compositions, particularly those which are highly viscous or solid polymeric resins initiated to foam by heat. Preferably the foams formed are closed cell foams. The preference is based on the improved dielectric properties associated with closed cell plastic foams.

Preferred adhesive foam forming compositions employed as the inner layers 18 in the insulator tubes 10 of the invention are dispersions of polymer resins such as polyvinyl chloride, polyethylene, polypropylene, natural rubber, butadiene-acrylonitrile rubber, styrene-butadiene copolymers, polyamides, polyesters and the like in admixture with appropriate and conventional tackifiers such as those disclosed in U.S. Pat. Nos. 2,319,271; 2,412,182; 3,239,478; and 3,554,940. Many of the polymer resin dispersions are inherently adhesive in nature and tackifiers need not be added; see for example the polyesterurethane adhesives of U.S. Pat. No. 3,538,055 which may be blended with conventional blowing agents for use as the inner layer 18. The compositions which comprise inner layer 18 include conventional blowing agents characterized by their decomposition at known temperatures to generate gaseous products. Preferred blowing agents are those which decompose under actinic radiation to produce nitrogen gas. Nitrogen gas is the preferred blowing gas because of its non-oxidative properties. Representative of such blowing agents are azodicarbonamide, 4,4'-oxybis (benzenesulphon hydrazide), dinitrosopentamethylene tetramine, tris [m-azidosulfonylbenzene] isocyanurate, tris [p-azidosulfonylbenzene] isocyanurate, p-toluenesulfonyl hydrazide, 2,2'-azobisisobutyronitrile and the like.

The proportion of blowing agent may be varied according to known techniques to cause a foam expansion of up to about 10 times. The techniques of preparing such blowing agents in polymer resin dispersions is well known; see for example Goldberg and Bolabanov, Zh. Organ. Kim., 1,(9), 1604-6, (1965) (Russ.). In general the blowing agent is blended into the polymer material. Blending may be carried out by milling on a conventional rubber mill or by dissolving in a solution of the polymer. Other methods of mixing the blowing agents and polymer resins will be apparent to those skilled in the art. Additives such as fillers, extenders, stabilizers, surfactants, dyes, plasticizers, fire retardants and the like may also be used to compound the compositions of layer 18 with any desired specific properties.

Most preferred of the foam-forming adhesive compositions used to fabricate the inner layer 18 are the thermally reactivated type, i.e.; the so-called "B-staged" adhesive. Illustrative of such adhesive forming compositions are polyester polyols in admixture with a blocked diisocyanate and a blowing agent. Upon heating, the diisocyanate is unblocked and made available for reaction with the polyol to obtain a polyester polyurethane adhesive. Simultaneously with the reaction, the blowing agent is activated to foam the polyurethane as it cures. Representative of polymeric resin foam forming adhesive compositions which may be used as layer 18 to coat the inside surface of tubular layer 16 is the following. All parts are by weight.

| Preparation 1 | Parts |
| --- | --- |
| linear saturated polyester* | 30 |
| phenol blocked toluene* diisocyanate | 0.5–1.0 |
| ketone solvent* | 60 |
| 2,2'-azobisisobutyronitrile | 2–3 |

*The above indicated three components are commercially available in a premixed composition (Bostik 7091; Bostik Div. U.S.M. Corporation, Middleton, Mass.).

The above preparation may be coated on the surface of a tubular shaped polymeric resin electrical insulator. Upon heating to a temperature of circa 350° F. the above preparation is converted to a polyurethane foam adhesive by melting, reaction and foaming (the latter by the release of nitrogen gas).

Figure 2:
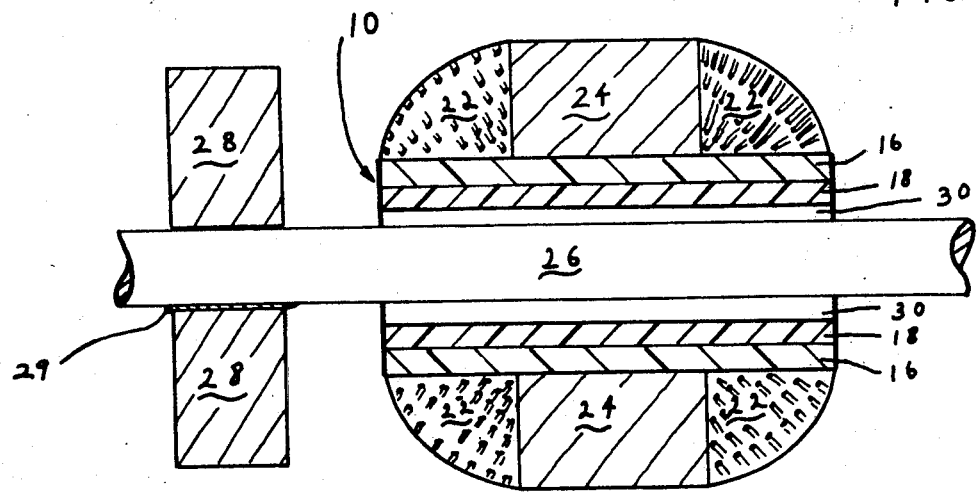
FIg. 2 is a cross-sectional in-part side elevation showing placement of the embodiment insulator of FIG. 1 in an armature, but prior to mounting on the armature shaft.
Figure 3:
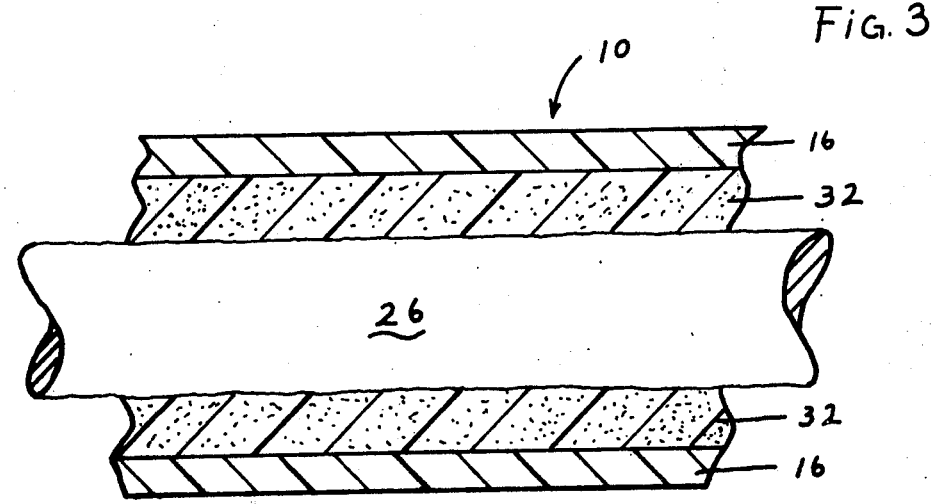
FIG. 3 is a cross-sectional side elevation of a fragment of the insulation embodiment of FIG. 1 shown mounted on an armature shaft.

The method of the invention is carried out by first inserting that portion of an electric motor armature shaft which will ultimately be positioned within the armature windings and laminations, into space 30 of the insulator 10. The shaft 26 should be prepared in the conventional manner to receive an adhesive coating, i.e., by chemically cleaning the surface. As shown in FIG. 2, a cross-sectional side elevation in part, armature shaft 26 with appurtenant commutator ring 28 mounted and secured by wedge 29 is shown as it would be positioned under windings 22 and laminations 24. The insulator 10 should serve as a complete barrier between shaft 26 and windings 22 and laminations 24. Preferably the insulator 10 extends about 3/16 of an inch beyond windings 22. After inserting the shaft 26, but before mounting in the armature, the insulator 10 is affixed to shaft 26 by activating the foam forming components of inner layer 18. The resulting polymeric resin adhesive foam 32 fills the space 30 and bonds to shaft 26 as shown in FIG. 3, a fragmentary cross-sectional side elevation of the insulator 10 mounted on shaft 26. Activation occurs by applying the necessary heat for melting and foaming inner layer 18. Heat may be applied from infrared sources, induction heating, ultrasonic energy, a baking oven or the like. The composition of layer 18 melts or fuses, the blowing agent decomposes to generate gas and the composition of layer 18 expands to form a cellular polymeric resin adhesive. Upon cooling, the foam solidifies, entrapping the gas bubbles. Since the adhesive means employed in the method of the invention is, inherently, applied under gaseous pressures, a very tight bond is effected when the foam 32 contacts the armature shaft 26 and cools to form a rigid adhesive closed cell foam.

The surface of the armature shaft is generally of a crystalline metal such as steel. Smekol [Phys. Zeit, 27, 837 (1925)] has described such crystalline surfaces as consisting of a mosaic of small blocks, with a number of minute cracks, fissures or grain boundaries of small dimension. An advantage of the method of the invention resides in the filling of these minute cracks, fissures or grain boundaries with adhesive foam under pressure to obtain a stronger adhesive bond. In a preferred method of the invention, a synthetic polymeric foam forming resin adhesive is applied to the surface of the shaft 26 under tube 10 before foaming. The two foaming layers then meet and fuse at a point intermediate to shaft 26 and layer 16.

The method of the invention as described above encapsulates the shaft 26 in a closed cell polymer resin foam. This has additional advantages for a double insulated electrical hand tool in that the foam is inherently shock absorbing and thermally insulative to increase insulator life even under adverse aging conditions such as exposure to moisture, high temperatures and heavy use. The closed cell foam also enhances and improves the electrical insulative capability of the insulator in regard to dielectric constant, dissipation factor and increased dielectric strength. All of these factors potentially upgrade the insulator within the classes of insulating materials and their limiting temperatures.

Figure 4:
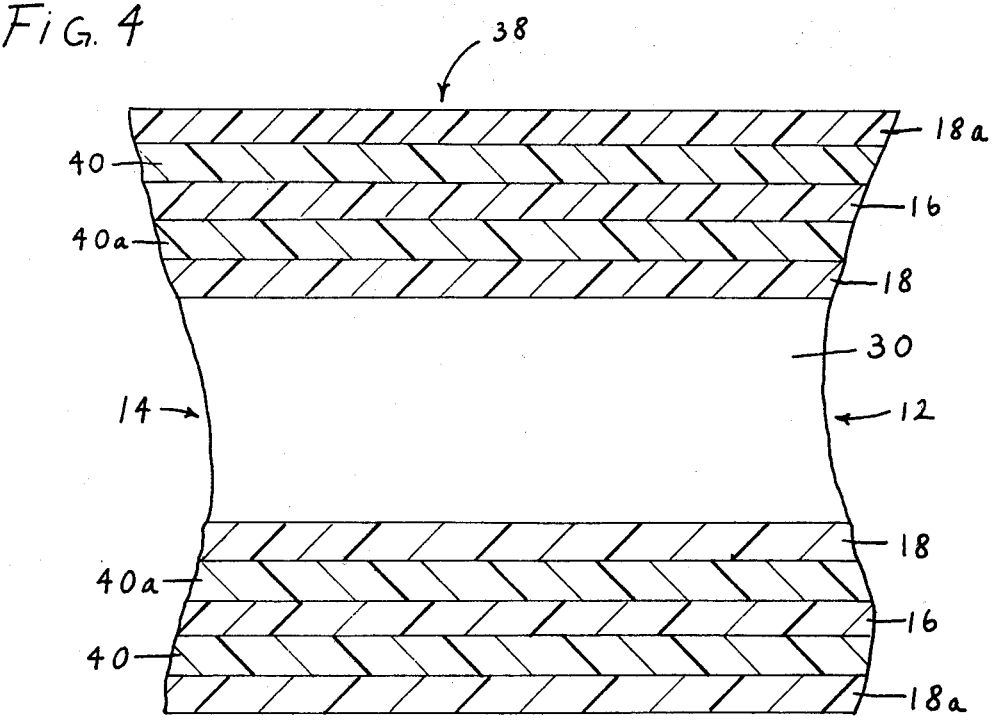
FIG. 4 is a cross-sectional side elevation in-part of a further embodiment of the invention.

Referring now to FIG. 4 there is seen a particularly preferred embodiment insulator of the invention. FIG. 4 shows a cross-sectional view in part of an insulator tube 38 which is, essentially, a tube 10 as shown in FIG. 1 having in addition to outer layer 16 and inner layer 18, an outermost layer 18a which is a synthetic polymeric resin, foam-forming adhesive composition as previously described and which may be identical to layer 18 in composition and thickness. Interposed between layer 18a and layer 16 is intermediate ply 40 and interposed between layer 16 and layer 18 is intermediate ply 40a. Plies 40 and 40a are each optional plies of impervious polymeric resin films as previously described for the purpose of preventing the migration of adhesives from layers 18 and 18a, particularly when the layer 16 is a material which will absorb the adhesive foam-forming compositions.

Figure 5:
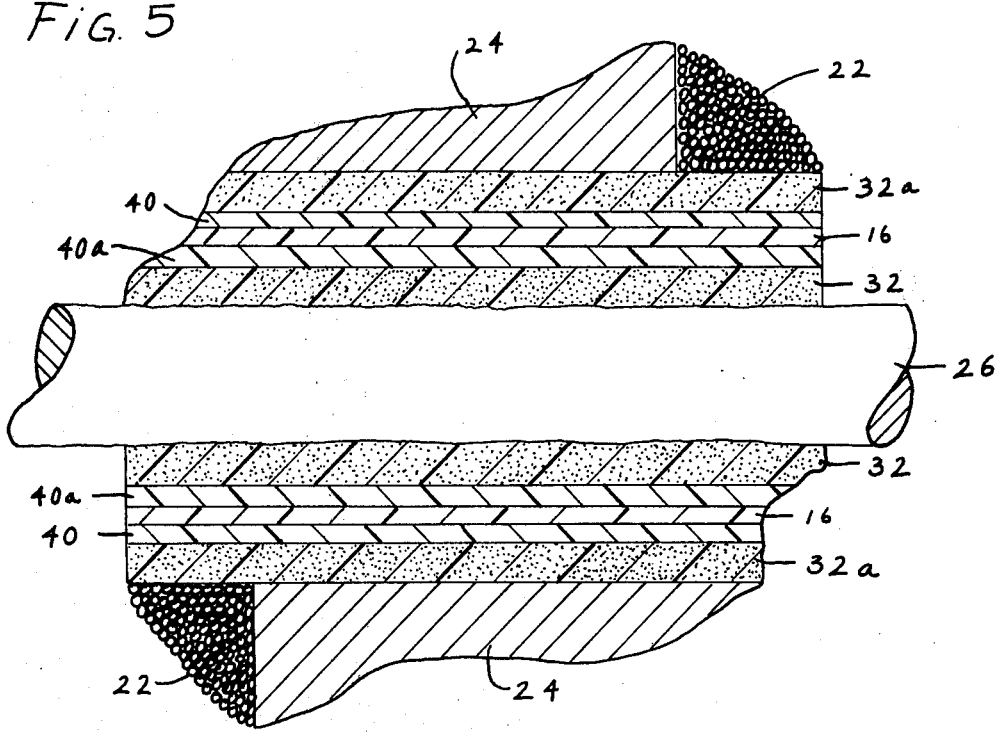
FIG. 5 is a view as shown in FIG. 3 but after installation in an armature.

The embodiment insulator 38 may be loosely assembled in place with the armature shaft and laminations. Upon heating as previously described, layers 18 and 18a will foam, the layer 18 adhesively bonding the insulator 38 to the armature shaft as previously described and the layer 18a will foam to adhesively bond and mount the insulator tube 38 and armature shaft 26 to the laminations and windings of the armature. Thus, the armature shaft and insulator are simultaneously mounted to obtain the armature whose components are tightly secured as shown in FIG. 5, a view as shown in FIG. 4 but after activation of the foam-forming layers 18 and 18a to obtain foam layers 32 and 32a, respectively.

Those skilled in the art will also appreciate that many variations of the preferred embodiments described above may be made without departing from the spirit and scope of the invention. For example, the insulators of the invention may be of many and varied shapes, sizes and materials.

What is claimed is:

1. A universal fitting electrical insulator for mounting between the armature shaft and the windings or laminations of an armature, which comprises; a tubular body laminate having two open ends and which comprises an outer layer of an electrical insulative polymeric material and an inner layer of a synthetic polymeric resin, unfoamed, foam forming, adhesive composition, said body together with said ends defining an empty chamber for receiving said armature shaft.

2. The insulator of claim 1 wherein said outer layer is a polyamide.

3. The insulator of claim 1 wherein said outer layer is separated from said inner layer by an interposed non-porous, synthetic polymeric resin film ply.

4. The insulator of claim 1 wherein said inner layer is a mixture which comprises a polyester polyol, a blocked diisocyanate and a blowing agent.

5. The insulator of claim 4 wherein said blowing agent decomposes under heat to produce nitrogen gas.

6. The insulator of claim 1 having an additional outermost layer of a synthetic polymeric resin, foam forming, adhesive composition.

7. The insulator of claim 6 wherein said layers of adhesive compositions are separated from the outer layer of electrical insulative polymeric material interposed non-porous, synthetic polymeric resin film plies.

8. A method of mounting a tubular electrical insulator on an armature shaft, which comprises;
   providing a tubular insulator having two open ends and which comprises an outer layer of an electrical insulating polymeric material and an inner layer of a synthetic polymeric resin, foam-forming, adhesive composition;
   inserting a portion of said armature shaft through the open ends of said insulator; and
   causing said foam-forming adhesive composition to foam;
   whereby said insulator becomes bonded to the inserted portion of said armature shaft.

9. A method according to claim 8 wherein said causing is by heating the foam-forming adhesive composition.

10. A method according to claim 8 which additionally comprises a coating said shaft with a synthetic, polymeric resin foam-forming adhesive composition prior to said inserting.

11. A method of mounting a tubular electrical insulator between the armature shaft and the windings and laminations of an armature, which comprises;
providing an insulator tube having two open ends and which comprises an outer layer of an electrical insulating polymeric material and inner and outermost layers of a synthetic polymeric resin, foam-forming, adhesive composition;
providing the windings and laminations of an armature, said windings and laminations defining a space for an armature shaft, said space having a diameter exceeding the outer diameter of said insulator tube;
providing an armature shaft for assembly in said space, said shaft having a diameter less than the diameter of the inner diameter of said insulator tube;
assemblying a portion of said shaft within the inner space defined by said insulator tube;
assemblying said insulator tube within the space defined by said windings and laminations; and
causing said foam-forming adhesive composition layers to foam;
whereby said shaft, said insulator tube and said windings and laminations become a unitary, bonded together, armature component.

12. A method according to claim 11 wherein said causing is by heating the foam-forming layers.

13. A method according to claim 11 which additionally comprises coating said shaft and said windings and laminations with a synthetic, polymeric resin foam-forming adhesive composition prior to assemblying.

* * * * *